United States Patent [19]
Bryson

[11] 3,904,704
[45] Sept. 9, 1975

[54] PROCESS FOR PREPARING NONCONJUGATED DIOLEFINS

[75] Inventor: Jay G. Bryson, Tallmadge, Ohio

[73] Assignee: The Goodyear Tire & Rubber Company, Akron, Ohio

[22] Filed: Mar. 18, 1974

[21] Appl. No.: 452,241

[52] U.S. Cl. .......................... 260/680 B; 252/431 N
[51] Int. Cl.² ............................................. C07C 3/21
[58] Field of Search ............. 260/680 B; 252/431 N

[56] References Cited
UNITED STATES PATENTS

| | | | |
|---|---|---|---|
| 3,441,627 | 4/1969 | Schneider | 260/680 B |
| 3,539,652 | 11/1970 | Schneider | 260/680 B |
| 3,565,875 | 2/1971 | Bozik et al. | 252/431 N |
| 3,669,949 | 6/1972 | Yoo | 260/680 B |
| 3,677,968 | 7/1972 | Bozik et al. | 252/431 N |
| 3,836,602 | 9/1974 | Wideman | 260/673 |

*Primary Examiner*—Paul M. Coughlan, Jr.
*Attorney, Agent, or Firm*—F. W. Brunner; J. Y. Clowney; R. A. Thompson

[57] ABSTRACT

Process for codimerizing conjugated diolefins and lower α-olefins to nonconjugated diolefins. The catalyst system employed is a mixture of (1) an iron compound, (2) a reducing agent which is an organo aluminum compound, and (3) a ligand described as a bidentate nitrogen compound.

6 Claims, No Drawings

PROCESS FOR PREPARING NONCONJUGATED DIOLEFINS

This invention relates to the codimerization of hydrocarbons. More specifically, it relates to an improved process for the production of nonconjugated diolefins from the codimerization of conjugated diolefins with lower α-olefins.

It is known that lower α-olefins and conjugated diolefins can be catalytically converted into codimers. These codimers are acyclic in nature and can take several forms. Certain nonconjugated diolefins such as 1,4-hexadienes are useful as comonomers in the preparation of terpolymers, and being one of the products that can result from the codimerization of certain conjugated diolefins and lower α-olefins, it is desirable to obtain as high a yield to the 1,4-hexadiene as possible.

It is known that certain iron-containing catalysts are useful in the codimerization of lower α-olefins and conjugated diolefins. These prior art processes which have been reported, for instance, use a catalyst system comprising a mixture of (1) an iron salt or complex, (2) a reducing agent, such as triethylaluminum, and (3) a ligand or other compound which has been determined to promote the desired product.

However, it has been observed that these prior art processes, while a substantial amount of the starting materials are converted to codimer, the selectivity to the desired product, namely the conjugated diolefins, is not very good. For instance, in prior art processes for codimerization of lower α-olefins and conjugated diolefins, the yield of the desired product is usually less than 60 percent.

It has been discovered that when certain changes in the catalyst ligand are employed, there is a considerable improvement in the rate of conversion of the conjugated diolefin to the codimer and some improvement in the selectivity to the nonconjugated diolefin material.

Accordingly, the invention is a process for the conversion of conjugated diolefins selected from the group consisting of isoprene, piperylene, 2-ethyl-1,3-butadiene, 2-phenyl-1,3-butadiene, 2-methyl-1,3-pentadiene and 3-methyl-1,3-pentadiene, with lower α-olefins to nonconjugated diolefins. Thus, the invention comprises contacting said conjugated diolefins and lower α-olefins with a ternary catalyst system comprisng (1) an iron compound selected from the group consisting of iron salts and iron complexes, (2) an organoaluminum compound, wherein the improvement comprises adding (3) a ligand which is characterized as a bidentate nitrogen compound in which the moiety

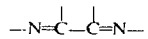

occurs.

The lower α-olefin hydrocarbons which can be utilized in this invention are ethylene, propylene and 1-butene. The preferred lower α-olefin is ethylene.

A more preferred group of monomers for codimerization would be isoprene codimerized with ethylene.

The second component of the catalyst system are reducing agents consisting of at least one member of the group consisting of organoaluminum compounds. Representative but not all-inclusive of suitable organoaluminum compounds are triethyl aluminum, triisobutyl aluminum, lithium tetraethylaluminate, diethyl aluminum ethoxide and the like. Trialkylaluminums such as triethylaluminum are the preferred organoaluminum are the preferred organoaluminum compounds for use with this invention.

The iron compounds useful in the practice of this invention are preferably the iron salts of carboxylic acids containing from 2 to 40 carbon atoms, or the iron complexes of such agents as 1,3-diketones. Representative but by no means exhaustive of the iron salts of such carboxylic acids include iron acetate, iron propionate, iron isobutyrate, iron n-pentanoate, iron 3-methyl butyrate, iron octanoate and various other iron salts of other carboxylic acids containing from 2 to 40 carbon atoms.

Representative of the iron complexes are iron 2,3-pentanedionate (commonly called iron acetylacetonate), iron 3-methyl-2,4-pentanedionate, iron 1-ethoxy-1,3-butanedionate, iron 1,3-diethoxy-1,3-propanedionate, iron-1,3-diphenyl-1,3-propanedionate, iron 1-cyclohexyl-1,3-butanedionate and other iron complexes of 1,3-diketones.

Also useful in this invention as an iron salt are the iron salts of alkyl substituted naphthenic carboxylic acids and the iron soaps or the soap called iron drier compounds. The iron salts of individual naphthenic acids are rarely found because the naphthenic acids are usually complex mixtures with their common derivatives being cyclopentane, cyclohexane, cycloheptane, and the higher molecular weight alkyl substituted analogs.

The cyclic soaps useful in this invention are usually iron in combination with fatty acids such as stearic resin (resinates) and tall oil (tallate).

Of all the compounds useful as the iron salt or iron complex in this invention, iron octanoate and iron acetylacetonate are preferred.

It has been discovered that certain of the catalyst systems utilized in this invention have a more powerful directing tendency to one isomeric form than the other. For instance, if isoprene and ethylene are codimerized, it is possible that the product could be a 50/50 mixture or a 4-methyl-1,4-hexadiene and a 5-methyl-1,4-hexadiene. Sometimes it is desirous to have more of one isomer than the other for final end use. It has been discovered that certain catalyst compositions give catalysts which cause the codimerization of ethylene and isoprene to give predominantly 5-methyl-1,4-hexadiene. Such compositions are illustrated by Examples 14 and 15. Certain other catalyst compositions, such as Examples 1 and 10 cause the codimerization of ethylene and isoprene to give predominantly 4-methyl-1,4-hexadiene, in higher selectivity and with greater catalyst activity than prior art iron-based catalysts.

The third component of the ternary catalyst system of this invention consists of a nitrogen bidentate ligand. Ligand is defined as an iron or molecule bound to and considered bonded to a metal atom or ion. Bidentate means having two positions through which covalent or coordinate bonds with the metal may be formed. The ligands useful in this invention are certain bidentate nitrogen compounds. These ligands are believed to direct the reaction toward codimerization wherein the codimer goes mainly to nonconjugated diolefins. The class of ligands which is employed in the present invention are those ligands responding to the formulas:

a. The compounds of the formula

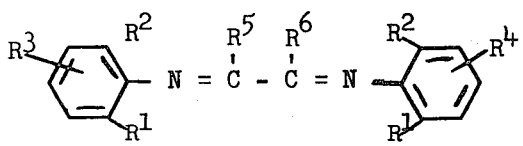

where $R^1$ and $R^2$ can be at least one hydrogen or methyl, $R^3$ and $R^4$ can be at least one hydrogen, alkyl, alkoxy, and/or dialkylamino group (where the alkyl or alkoxy contain from 1 to 4 carbons), and where $R^5$ and $R^6$ can be hydrogen or methyl.

b. The compounds of the formula

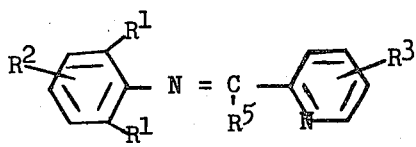

where $R^1$ can be hydrogen, or alkyl (1–4 carbons), $R^2$ and $R^3$ can be at least one hydrogen, alkyl, alkoxy, and/or dialkylamino group (where the alkyl or alkoxy contain from 1 to 4 carbons) and where $R^5$ can be hydrogen or methyl.

c. The compounds of the formula

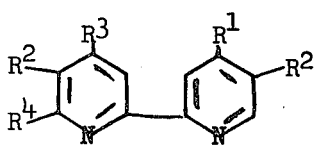

where $R^1$, $R^2$ and $R^3$ can be at least one hydrogen, alkyl, alkoxy and/or dialkylamino (where the alkyls or alkoxy contain from 1 to 4 carbons) and $R^4$ can be hydrogen or alkyl (1–4 carbons).

Representative of the compounds which can be utilized in this invention, which correspond to the above formulas are: glyoxal-bis-(2,6-dimethylanil), biacetyl-bis-(2,6-dimethylanil), glyoxal-bis-(4-methylanil), biacetyl-bis-(4-methylanil), glyoxal-bis-(2-methylanil), biacetyl-bis-(2-methylanil), glyoxal-bisanil, biacetyl-bisanil, glyoxal-bis(4-ethoxyanil), biacetyl-bis-(4-ethoxyanil), glyoxal-bis-(3-methoxyanil), biacetyl-bis-(3-methoxyanil), glyoxal-bis-(4-dimethylaminoanil), biacetyl-bis-(4-dimethylaminoanil), glyoxal-bis-(2,6-dimethyl-4-ethoxyanil), biacetyl-bis-(2,6-dimethyl-4-ethoxyanil), 2-pyridine carboxyaldehyde anil, 2-pyridine carboxaldehyde-2-methylanil, 2-pyridine carboxaldehyde-4-methylanil, 2-pyridine carboxaldehyde-2-isopropylanil, 2-pyridine carboxaldehyde-2-ethylanil, 2-pyridine carboxaldehyde-4-methoxyanil, 2-pyridine carboxaldehyde-4-dimethylaminoanil, 2-pyridine carboxaldehyde-2,6-dimethyl-4-methoxyanil, 2-pyridine carboxaldehyde-2,6-dimethyl-4-dimethylaminoanil, 2-pyridine carboxaldehyde-2,6-diethyl-4-diethylaminoanil, 2-acetylpyridine-2-methylanil, 2-acetylpyridine-4-methylanil, 2-acetylpyridine-2-isopropylanil, 2-acetylpyridine-2,6-diethylanil, 2-acetylpyridine-4-methoxyanil, 2acetylpyridine-4-dimethylaminoanil, 2-acetylpyridine-2,6-dimethyl-4-methoxyanil, 2-acetylpyridine-2,6-diethyl-4-aminoanil, 2,2'-bipyridyl, 6-methyl-2,2'-bipyridyl 5,5'-ditert butyl-2,2'-pyridyl, 4,4'-dimethoxybipyridyl, 4,4'-di-(di-methylamino)bipyridyl.

The components of the catalyst system employed in this invention should be as pure as can be economically obtained and the catalyst components as well as the codimerization reaction system should be essentially free of moisture and other deleterious substances. The iron compound and the ligand should be mixed together before the reducing agent is added.

In the particular catalyst system of this invention cyclopentadiene is a poison that is significantly detrimental to the activity if it is above 200 parts per million. Other hydrocarbons such as alkanes, olefins and alkynes are not detrimental to this system. Therefore, an aspect of this invention is that an isoprene monomer stream does not have to be high purity. For example, an isoprene monomer stream containing about 28 percent isoprene (contaminated with alkanes, alkenes, and about one percent of acetylenic compounds) can be effectively used for codimerization with the catalysts described in the present invention.

The mole ratios of the reactants can vary over a considerable range. For instance, the mole ratio of the iron compound to the mole ratio of the conjugated diolefin can range from about 10/1 to about $10^5/1$; however, a more preferable range is from about 1000/1 to about $10^4/1$.

The mole ratio of the ligand to the iron compound may vary from about 0.7/1 to about 5/1. A more preferred range would be from about 1/1 to about 3/1.

The mole ratio of the reducing compound to the iron compound may range from about 1/1 to about 12/1. A more preferred range is from about 4/1 to about 9/1.

The temperature at which the codimerization process of this invention is conducted may vary from a low temperature of about 60°C. up to 130°C. However, it has been found that the best results have been obtained when the reaction is run from about 80° to about 100°C. The reaction may be run as a batch or continuous process. The diolefin may be added to the reaction mixture all at once, or gradually. It is usually desirable, but not necessary, to conduct the codimerization in the presence of an inert solvent or diluent. The term "inert" is meant to denote that the solvent has no adverse effect on the reaction. Representative of such solvents are pentane, hexane, heptane, octane, cyclohexane, mixtures of petroleums boiling between 60°C. and 200°C., benzene, toluene, ethylbenzene, xylene, 1,5-cyclooctadiene, dimethyl-1,5-cyclooctadiene or mixtures thereof. When diethyl aluminum ethoxide is used as a reductant, diethyl ether or anisole may be used as solvent.

The pressures which are employed in this process can range from ambient pressure created by the monomer/solvent system at operating temperature up to 5000 psig. Preferably, however, it is practical to employ pressures from about 200 to 1000 psig with reactions involving ethylene, and 50–600 psig with propylene or 1-butene reactions.

Further practice of this invention is illustrated by reference to the following examples which are intended to be illustrative and in no manner limiting.

EXAMPLE I

To a 100 ml. reactor under an ethylene atmosphere was added iron octanoate (0.05 millimoles in mineral spirits), 13.2 mg. of glyoxal-bis-2,6-dimethylanil in 10 ml. isoprene (containing pentane as an internal standard), and 0.2 millimoles of triethylaluminum ($Et_3Al$) in 4.85 ml. of xylene. The reactor was pressurized with ethylene to 600 psi, and the reaction mixture was stirred at 90°C. for 30 minutes. A 3 ml. sample of the reaction mixture was quenched in a mixture of 30 ml. of chlorobenzene and 0.2 ml. of $H_2O$, then analyzed by gas chromatography. Isoprene conversion was 90 percent. Selectivities to 4- and 5-methyl-1,4-hexadienes were 67 and 28 percent, respectively. By-products were formed in 5 percent selectivity.

EXAMPLE II

The same procedure was used as in Example I except that the ligand was not added to the catalyst system. Isoprene conversion was 35 percent. Selectivities to 4- and 5-methyl-1,4-hexadienes were 34 and 36 percent respectively. By-products were formed in 6 percent selectivity and isoprene dimers were formed in 24 percent selectivity.

EXAMPLE III

This comparative example illustrates how a ligand which does not contain the —N=C—C=N— moiety affects the conversion and desired selectivity. The following run was made: 0.05 millimoles of iron octanoate, 11.7 milligrams of ethylene bisbenzilidine in 15 milliliters of xylene and 15 milliliters of isoprene (containing pentane as an internal standard) were put in a 100 milliliter reactor at 90°C. under 100 psig of ethylene. The mixture was treated with 0.1 milliliters of 2 molar $Et_3Al$, and shaken under 600 psig of ethylene at 90°C. for 30 minutes. Isoprene conversion was 42 percent. Selectivity to 4-methyl-1,4-hexadiene was 31 percent. Selectivity to 5-methyl-1,4-hexadiene was 34 percent. Selectivity to by-products was 6 percent.

EXAMPLE IV

To a 100 ml. reactor was added 0.05 millimoles of iron octanoate, 16.2 milligrams of biacetyl-bis(4-ethoxyanil) in 10 milliliters of toluene, and 15 milliliters of isoprene (containing pentane as an internal standard) at 90°C. (under 100 psig of ethylene). The mixture was treated with 0.1 milliliters of 2 molar $Et_3Al$, and shaken under 600 psig of ethylene at 90°C. for 30 minutes. Isoprene conversion was 100 percent. Selectivity to 4-methyl-1,4-hexadiene was 39 percent. Selectivity to 5-methyl-1,4-hexadiene was 47 percent.

EXAMPLE V

Example V is similar to Example IV except that 7.7 milligrams of 2,2'-bipyridyl were used as the ligand. Isoprene conversion was 99.7 percent. Selectivity to 4-methyl-1,4-hexadiene was 30 percent. Selectivity to 5-methyl-1,4-hexadiene was 40 percent.

EXAMPLE VI

To a 100 ml. reactor under an ethylene atmosphere was added iron octanoate (0.15 millimoles), 23.1 milligrams of 2,2'bipyridyl in 10 milliliters of toluene, 15 milliliters of isoprene, 0.6 millimoles of $Et_3Al$ in 0.3 milliliters of toluene at 90°C. The reactor was pressurized with ethylene at 900 psig, and stirred at 90°C. for 10 minutes. Isoprene conversion was 99 percent. Selectivity to 4-methyl-1,4-hexadiene was 30 percent. Selectivity to 5-methyl-1,4-hexadiene was 43 percent.

EXAMPLE VII

Example VII is similar to Example VI except that 46.2 milligrams of 2,2'-bipyridyl was used. Isoprene conversion was 91 percent. Selectivities to 4- and 5-methyl-1,4-hexadiene were 30 and 43 percent respectively.

EXAMPLE VIII

To a 100 ml. reactor was added 0.15 millimoles of iron octanoate, 23.1 milligrams of 2,2'-bipyridyl in 10 milliliters of 1,5-cyclooctadiene, and 15 milliliters of isoprene (containing a small amount of pentane as an internal standard) at 85°C. under 100 psig of ethylene. The mixture was treated with 0.3 milliliters of 2-molar $Et_3Al$ in toluene and shaken under 900 psig of ethylene at 90°–105°C. for 10 minutes. Isoprene conversion was 100 percent. Selectivity to 4-methyl-1,4-hexadiene was 35 percent. Selectivity to 5-methyl-1,4-hexadiene was 37 percent.

EXAMPLE IX

To a 30 ml. reactor was added 5 gms. propylene, 2.8 ml. of xylene, 0.1 millimoles of iron octanoate, 26.4 mg. of glyoxal-bis-2,6-dimethylanil in 1 ml. of xylene, 5 ml. of isoprene, 0.4 millimoles of $Et_3Al$ in 1.2 ml. of xylene and then shaken at 100°C. for 80 minutes. Isoprene conversion was 13 percent. Two $C_8$ unconjugated dienes were formed in 54 and 34 percent selectivity, respectively.

EXAMPLE X

To a 100 ml. reactor was added iron octanoate (0.15 millimoles in mineral spirits), 39.6 milligrams of glyoxalbis-2,6-dimethylanil in 10 milliliters of xylene, 15 milliliters of isoprene 0.6 millimoles of $Et_3Al$ in 4.5 milliliters of xylene. Procedures similar to Example I were used. Isoprene conversion was 100 percent. Selectivities to 4- and 5-methyl-1,4-hexadienes were 90 and 8 percent respectively. No isoprene dimers were observed.

EXAMPLE XI

To a 30 ml. reactor under an ethylene atmosphere was added iron octanoate (0.05 millimoles), 0.075 millimoles of biacetyl bisanil in 2.55 milliliters of xylene, 5 milliliters of isoprene (96.5 percent pure), 0.2 millimoles of $Et_3Al$ in 2.4 milliliters of xylene at 100°C, then treated with 100 milliliterss of ethylene and shaken at 100°C. for 1 hour. The reaction mixture was analyzed as in Example I. Isoprene conversion was 99 percent. Selectivities to 4- and 5-methyl-1,4-hexadiene were 43 and 37 percent, respectively.

EXAMPLE XII

To a 100 ml. reactor under an ethylene atmosphere was added iron octanoate (0.15 millimoles), 35.4 millimoles of glyoxal-bis (2-methylanil) in 10 milliliters of toluene, 15 milliliters of isoprene, 0.6 millimoles of $Et_3Al$ in 0.3 milliliters of toluene at 90°C. The reactor was pressurized with ethylene at 600 psig, and stirred for 30 minutes. Isoprene conversion was 99.7 percent. Selectivity to 4-methyl-1,4-hexadiene was 40 percent. Selectivity to 5-methyl-1,4-hexadiene was 40 percent.

EXAMPLE XIII

To a 100 ml. reactor under an ethylene atmosphere was added iron octanoate (0.15 millimoles), 31.5 milligrams of pyridine-2-carboxaldehyde-2-methylanil in 45 milliliters of toluene, 0.6 millimoles of $Et_3Al$ in 0.3 milliliters of toluene at 90°C. The reactor was pressurized with ethylene at 600 psig, and stirred for 15 minutes.

Isoprene conversion was 93 percent. Selectivities to 4- and 5-methyl-1,4-hexadiene were 35 percent and 42 percent respectively.

EXAMPLE XIV

To a 1-liter stainless steel reactor was added 100 milliliters of isoprene at 90°C. under 200 psig of ethylene and treated with a mixture (which has been premixed for 20 minutes at room temperature) of: one millimole of iron octanoate, 650 milligrams of biacetyl-bis-4-ethoxyanil, and 6 millimoles of $Et_3Al$, in 20 milliliters of xylene. The total mixture was stirred for 30 minutes at 90°C. under 600 psig of ethylene. Percent conversion of isoprene was 91 percent, percent selectivity to 5-methyl-1,4-hexadiene was 64 percent. Percent selectivity to 4-methyl-1,4-hexadiene was 34 percent.

EXAMPLE XV

A similar procedure was used as in Example XIV except that 312 milligrams of 2,2'-bipyridyl was used as the ligand. Isoprene conversion was 70 percent. Selectivity to 5-methyl-1,4-hexadiene was 50 percent. Selectivity to 4-methyl-1,4-hexadiene was 31 percent.

The catalyst system of the present invention can be used to recover butadiene values from $C_4$ streams and isoprene and piperylene values from $C_5$ streams by mixing the stream with ethylene and the catalyst, forming a codimer, and separating the stream from the codimer by fractional distillation.

EXAMPLE XVI

In a 1-liter stainless steel reactor were charged 30 milliliters of xylene, and 100 milliliters of a (sodium distilled) $C_5$ by-product stream (containing 7 percent $C_4$–$C_6$ alkanes, 65 percent $C_5$ olefins, 28 percent isoprene, and traces of acetylenes, dimethylsulfide, diethylether, and 1,5-cyclopentadiene). The mixture was heated to 90°C. under 200 psig of ethylene, treated with a mixture of 0.5 millimoles of iron octanoate, 320 milligrams of biacetyl-bis(4-ethoxyanil), and 3 millimoles of triethylaluminum in 20 milliliters of xylene, and stirred under 600 psig of ethylene for 30 minutes.

Isoprene conversion was 99.7 percent. Selectivity to 5-methyl-1,4-hexadiene was 60 percent. Selectivity to 4-methyl-1,4-hexadiene was 35 percent.

EXAMPLE XVII

In a 1-liter stainless steel reactor were charged 30 milliliters of xylene, and 100 milliliters of a (sodium distilled) $C_5$ by-product stream (containing 6 percent $C_4$–$C_6$ alkanes, 46 percent $C_5$ olefins, 22 percent isoprene, 26 percent trans-piperylene, and traces of acetylenes, dimethylsulfide, diethylether, and 1,5-cyclopentadiene). The mixture was heated to 90°C. under 200 psig of ethylene, treated with a mixture of 0.5 millimoles of iron octanoate, 320 milligrams of biacetyl-bis(4-ethoxyanil) and 3 millimoles of triethylaluminum in 20 milliliters of xylene, and stirred under 600 psig of ethylene for 20 minutes. Isoprene conversion was 98.6 percent, and selectivities to 5- and 4-methyl-1,4-hexadiene were 54 and 36 percent respectively. Piperylene conversion was 97.4 percent and selectivities to 3-methyl-1,4-hexadiene and 1,4-heptadiene were 87 and 5 percent respectively.

While certain representative embodiments and details have been shown for the purpose of illustrating the invention, it will be apparent to those skilled in this art that various changes and modifications may be made therein without departing from the spirit or scope of the invention.

What is claimed is:

1. A process for codimerizing conjugated diolefins selected from the group consisting of isoprene, piperylene, 2-ethyl-1,3-butadiene, 2-phenyl-1,3-butadiene, 2-methyl-1,3-pentadiene and 3-methyl-1,3-pentadiene with lower α-olefins to nonconjugated diolefins which comprises contacting said diolefins and lower α-olefins with a ternary catalyst system consisting essentially of (1) an iron compound selected from the group consisting of iron salts of carboxylic acids containing from 2 to 40 carbon atoms and iron complexes of 1,3-diketones, (2) an organoaluminum compound selected from the group consisting of trialkyl aluminums, lithium tetraethyl aluminate and diethyl aluminum ethoxide, and (3) a bidentate nitrogen compound selected from the group consisting of glyoxal-bis-(2,6-dimethylanil), biacetyl-bis-(2,6-dimethylanil), glyoxal-bis-(4-methylanil), biacetyl-bis-(4-methylanil), glyoxal-bis-(2-methylanil), biacetyl-bis-(2-methylanil), glyoxal-bisanil, biacetyl-bisanil, glyoxal-bis-(4-ethoxyanil), biacetyl-bis-(4-ethoxyanil), glyoxal-bis-(3-methoxyanil), biacetyl-bis-(3-methoxyanil), glyoxal-bis-(4-dimethylaminoanil), biacetyl-bis-(4-dimethylaminoanil), glyoxal-bis-(2,6-dimethyl-4-ethoxyanil), biacetyl-bis-(2,6-dimethyl-4-ethoxyanil), 2-pyridine carboxaldehydeanil, 2-pyridine carboxaldehyde-2-methylanil, 2-pyridinecarboxaldehyde-4-methylanil, 2-pyridinecarboxaldehyde-2-isopropylanil, 2-pyridinecarboxaldehyde-2-ethylanil, 2-pyridinecarboxaldehyde-4-methoxyanil, 2-pyridinecarboxaldehyde-4-dimethylaminoanil, 2-pyridinecarboxaldehyde-2,6-dimethyl-4-methoxyanil, 2-pyridinecarboxaldehyde-2,6-dimethyl-4-dimethylaminoanil, 2-pyridinecarboxaldehyde-2,6-diethyl-4-diethylaminoanil, 2-acetylpyridine-2-methylanil, 2-acetylpyridine-4-methylanil, 2-acetylpyridine-2-isopropylanil, 2-acetylpyridine-2,6-diethylanil, 2-acetylpyridine-4-methoxyanil, 2-acetylpyridine-4-dimethylaminoanil, 2-acetylpyridine-2,6-dimethyl-4-methoxyanil and 2-acetylpyridine-2,6-diethyl-4-diethylaminoanil.

2. A process according to claim 1 wherein the lower α-olefin is ethylene and has a pressure of from 200 to 1000 psig; the mole ratio of the iron compound/conjugated diolefin is 1000/1 to $10^4/1$; the mole ratio of the bidentate nitrogen compound/iron compound is from 1/1 to 3/1; the mole ratio of the organoaluminum compound/iron compound is from 4/1 to 9/1, and the organoaluminum compound is a trialkyl aluminum.

3. A process according to claim 1 wherein the lower α-olefin hydrocarbon is selected from the group consisting of ethylene, propylene and 1-butene.

4. A process according to claim 3 in which isoprene and ethylene are codimerized, wherein the catalyst consists of glyoxal-bis-2,6-dimethylanil, iron octanoate and triethyl aluminum whereby said hydrocarbons are converted to 4 and 5-methyl-1,4-hexadienes, whereby the 4-methyl-1,4-hexadiene is the major product.

5. A process according to claim 3 in which isoprene and ethylene are codimerized wherein the catalysts consist of iron octanoate, biacetyl-bis-4-dimethylaminoanil and triethylaluminum, whereby said hydrocarbons are converted predominately to 5-methyl-1,4-hexadiene.

6. A process according to claim 3 in which isoprene and ethylene are codimerized wherein the catalysts consist of iron octanoate, biacetyl-bis-3,4-diethoxyanil and triethylaluminum whereby said hydrocarbons are converted to predominately 5-methyl-1,4-hexadiene.

* * * * *